US011366774B2

(12) United States Patent
Intrater et al.

(10) Patent No.: US 11,366,774 B2
(45) Date of Patent: Jun. 21, 2022

(54) MEMORY LATENCY REDUCTION IN XIP MODE

(71) Applicant: Adesto Technologies Corporation, Santa Clara, CA (US)

(72) Inventors: Gideon Intrater, Sunnyvale, CA (US); Bard Pedersen, Fremont, CA (US)

(73) Assignee: Adesto Technologies Corporation, Santa Clara, CA (US)

( * ) Notice: Subject to any disclaimer, the term of this patent is extended or adjusted under 35 U.S.C. 154(b) by 0 days.

(21) Appl. No.: 17/030,594

(22) Filed: Sep. 24, 2020

(65) Prior Publication Data

US 2022/0092004 A1 Mar. 24, 2022

(51) Int. Cl.
*G06F 13/14* (2006.01)
*G06F 13/16* (2006.01)
*G06F 3/06* (2006.01)
*G06F 12/02* (2006.01)
*G06F 13/42* (2006.01)

(52) U.S. Cl.
CPC ........ *G06F 13/1668* (2013.01); *G06F 3/0611* (2013.01); *G06F 3/0634* (2013.01); *G06F 3/0659* (2013.01); *G06F 3/0679* (2013.01); *G06F 12/0246* (2013.01); *G06F 13/4282* (2013.01); *G06F 2212/1024* (2013.01); *G06F 2212/2022* (2013.01)

(58) Field of Classification Search
CPC ............. G06F 13/1668; G06F 13/4282; G06F 3/0611; G06F 3/0634; G06F 3/0659; G06F 3/0679; G06F 12/0246; G06F 2212/1024; G06F 2212/2022
See application file for complete search history.

(56) References Cited

U.S. PATENT DOCUMENTS

| | | | |
|---|---|---|---|
| 6,249,823 B1 * | 6/2001 | Zervens | G06F 13/423 710/118 |
| 6,272,584 B1 * | 8/2001 | Stancil | G06F 13/362 710/36 |
| 6,321,315 B1 | 11/2001 | LaBerge | |
| 7,562,180 B2 | 7/2009 | Gyl et al. | |
| 7,593,263 B2 | 9/2009 | Sokolov et al. | |
| 8,209,478 B2 * | 6/2012 | Chiu | G06F 13/1626 711/E12.002 |
| 8,719,517 B2 * | 5/2014 | Li | G06F 13/4243 711/103 |
| 8,806,071 B2 | 8/2014 | Zitlaw | |
| 8,966,151 B2 | 2/2015 | Zitlaw | |
| 9,454,421 B2 | 9/2016 | McClain et al. | |
| 9,812,183 B2 | 11/2017 | Intrater et al. | |
| 10,290,334 B2 | 5/2019 | Intrater et al. | |
| 10,726,888 B2 | 7/2020 | Intrater et al. | |
| 11,042,500 B1 * | 6/2021 | Guo | G06F 13/4291 |

(Continued)

*Primary Examiner* — Cheng Yuan Tseng (57) ABSTRACT

A method of controlling a read request can include: receiving, in a host device, the read request from a bus master, where the host device is coupled to a memory device by an interface; determining a configuration state of the read request; comparing an attribute of the read request against a predetermined attribute stored in the host device; adjusting the configuration state of the read request when the attribute of the read request matches the predetermined attribute; and sending the read request with the adjusted configuration state from the host device to the memory device via the interface.

18 Claims, 12 Drawing Sheets

(56) References Cited

U.S. PATENT DOCUMENTS

| | | | |
|---|---|---|---|
| 2009/0024776 A1* | 1/2009 | Cheung | G06F 13/385 |
| | | | 710/110 |
| 2010/0124102 A1 | 5/2010 | Lee et al. | |
| 2015/0143020 A1 | 5/2015 | Ferreira et al. | |
| 2017/0300329 A1* | 10/2017 | Noguchi | G06F 9/38 |

* cited by examiner

MEMORY LATENCY REDUCTION IN XIP MODE

FIELD OF THE INVENTION

The present invention generally relates to the field of semiconductor devices. More specifically, embodiments of the present invention pertain to memory devices, including both volatile and non-volatile memory devices, such as flash memory devices, resistive random-access memory (ReRAM), and/or conductive bridging RAM (CBRAM) processes and devices.

BACKGROUND

Non-volatile memory (NVM) is increasingly found in applications, such as solid-state hard drives, removable digital picture cards, automotive electronics, home appliances, and so on. Flash memory is the predominant NVM technology in use today. However, flash memory has limitations, such as a relatively high power, as well as relatively slow operation speed. Microprocessor performance can be very sensitive to memory latency. Many non-volatile memory devices have an access time or latency that is relatively slow as compared to the microprocessor. In addition, many implementations of various communication protocols between a microprocessor/host and memory, such as serial peripheral interface (SPI) can add even more latency than is required by the memory array itself.

DETAILED DESCRIPTION OF EMBODIMENTS

Reference will now be made in detail to particular embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, structures, and circuits have not been described in detail so as not to unnecessarily obscure aspects of the present invention.

Some portions of the detailed descriptions which follow are presented in terms of processes, procedures, logic blocks, functional blocks, processing, schematic symbols, and/or other symbolic representations of operations on data streams, signals, or waveforms within a computer, processor, controller, device, and/or memory. These descriptions and representations are generally used by those skilled in the data processing arts to effectively convey the substance of their work to others skilled in the art. Usually, though not necessarily, quantities being manipulated take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like.

Particular embodiments may be directed to memory devices, including volatile memory, such as SRAM and DRAM, and including non-volatile memory (NVM), such as flash memory devices, and/or resistive switching memories (e.g., conductive bridging random-access memory [CBRAM], resistive RAM [ReRAM], etc.). Particular embodiments can include structures and methods of operating flash and/or resistive switching memories that can be written (programmed/erased) between one or more resistance and/or capacitive states. In one particular example, a CBRAM storage element may be configured such that when a forward or reverse bias greater than a threshold voltage is applied across electrodes of the CBRAM storage element, the electrical properties (e.g., resistance) of the CBRAM storage element can change. In any event, certain embodiments are suitable to any type of memory device, and in particular NVM devices, such as flash memory devices, and may include resistive switching memory devices in some cases.

Figure 1:
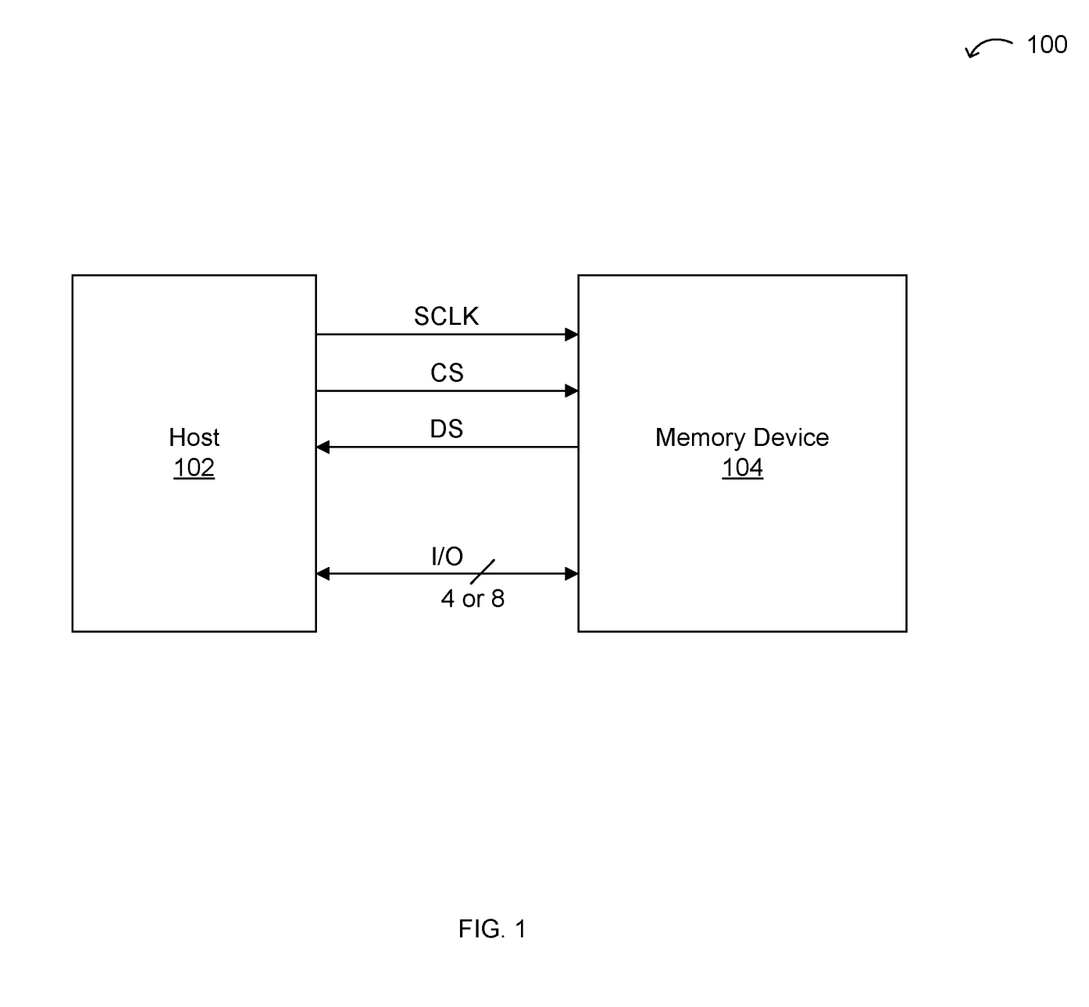
FIG. 1 is a schematic block diagram of an example host and memory device arrangement, in accordance with embodiments of the present invention.

Referring now to FIG. 1, shown is an example memory device and host arrangement 100, in accordance with embodiments of the present invention. In this example, host 102 can interface with memory device 104 via a serial interface. For example, host 102 can be any suitable controller (e.g., CPU, MCU, general-purpose processor, GPU, DSP, etc.), and memory device 104 can be any type of memory device (e.g., SRAM, DRAM, EEPROM, Flash, CBRAM, magnetic RAM, ReRAM, etc.). Memory device 104 can thus be implemented in a variety of memory technologies, such as non-volatile types. In some cases, memory device 104 can be a serial flash memory that may be implemented in more traditional non-volatile memories, or in CBRAM/ReRAM resistive switching memories.

Various interface signals, such as in a serial peripheral interface (SPI), can be included for communication between host 102 and memory device 104. For example, serial clock (SCK) can provide a clock to device 104, and may be used to control the flow of data to the device. Command, address, and input data (e.g., via I/O pins) can be latched by memory device 104 on a rising edge of SCK, while output data (e.g., via I/O pins) can be clocked out of memory device 104 by SCK or data strobe (DS). Chip select (CS), which may be active low, can be utilized to select memory device 104, such as from among a plurality of such memory devices sharing a common bus or circuit board, or otherwise as a way to access the device. When the chip select signal is de-asserted (e.g., at a high level), memory device 104 can be deselected, and placed in a standby mode. Activating the chip select signal (e.g., via a high to low transition on CS) may be utilized to start an operation, and returning the chip select signal to a high state can be utilized for terminating an operation. For internally self-timed operations (e.g., a program or erase cycle), memory device 104 may not enter standby mode until completion of the particular ongoing operation if chip select is de-asserted during the operation.

In the example interface, data can be provided to (e.g., for write operations, other commands, etc.) and from (e.g., for read operations, verify operations, etc.) memory device 104 via the I/O signals. For example, input data on the I/O can be latched by memory device 104 on edges of serial clock SCK, and such input data can be ignored if the device is deselected (e.g., when the chip select signal is de-asserted). Data can be output from memory device 104 via the I/O signals as well. For example, data output from memory device 104 can be clocked out on edges of DS or SCK for timing consistency, and the output signal can be in a high impedance state when the device is deselected (e.g., when the chip select signal is de-asserted). For example, input data may be clocked either on one edge (SDR/STR) or both edges (DDR/DTR) of SCK for command, address, or data, or a combination of both. Similarly, output data may be clocked on either one edge (SDR/STR) or both edges (DDR/DTR) of SCK or DS for data. Further, output data may, but is not required to, use the same clocking mode as the input data. Also, in some devices/arrangements, DS can be an optional signal. Further, while 4 or 8 I/O lines are shown in the particular example of FIG. 1, any number of I/O lines (e.g., 1, 2, 4, 8, 16, etc.) can be supported in certain embodiments.

Figure 2:
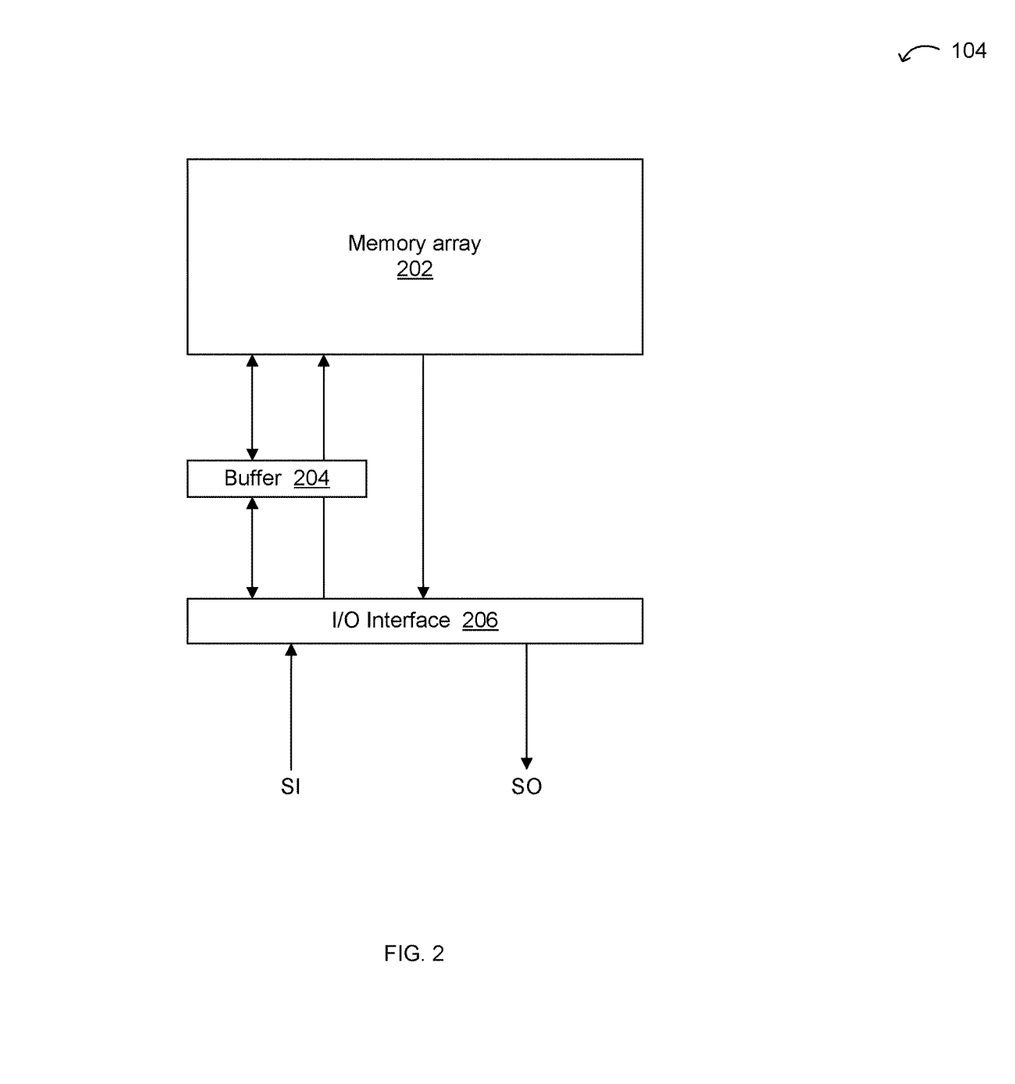
FIG. 2 is a schematic block diagram of an example memory device structure with a data buffer, in accordance with embodiments of the present invention.

Referring now to FIG. 2, shown is a schematic block diagram of an example memory device 104 structure with a data buffer, in accordance with embodiments of the present invention. For example, memory device 104 can include memory array 202, buffer 204 (e.g., SRAM or other fast access memory), and I/O interface 206. In some arrangements, more than one buffer 204 can be provided, such as a buffer for an input path, and another buffer for an output path. Alternatively, or in addition, multiple buffers can be provided for multi-layer buffering. For example, memory device 104 can be configured as a data flash and/or a serial flash device. Memory array 202 can be organized as any suitable number of pages of data. For example, each page can include 256 or 264 bytes of data. Similarly, buffer 204 can store at least a page of data. I/O interface 206 can provide interfacing between memory array 202, buffer 204, and serial data input (SI) and output (SO). For example, I/O interface 206 may be part of an SPI or other serial type of interface, and may also support a number of SPI interface modes (e.g., Single SPI, QPI, Octal, x16 modes, etc.).

Figure 3:
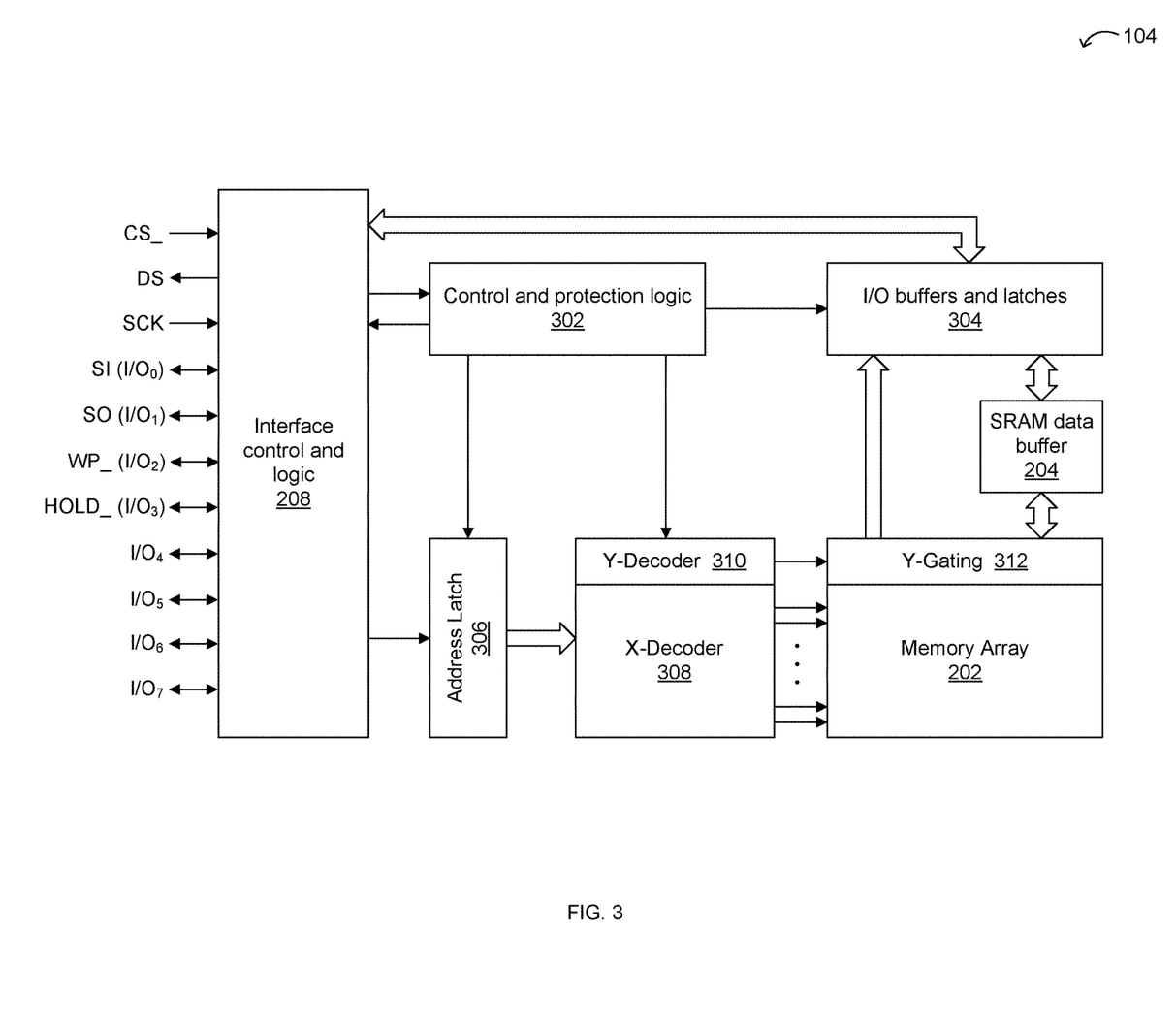
FIG. 3 is a schematic block diagram of an example memory device, in accordance with embodiments of the present invention.

Referring now to FIG. 3, shown is a schematic block diagram of an example memory device, in accordance with embodiments of the present invention. Memory device 104 can include interface control and logic 208, which may manage the interface (e.g., SPI interface), and decode the command and address information. Control and protection logic 302 can include control circuitry for reading and writing to the memory array, including address mapping and control for byte access and group addressing/ordering, as will be discussed in more detail below. For example, control and protection logic 302 can include a command decoder, registers for command execution parameters (e.g., read parameters, program/erase parameters, etc.), as well as a controller for command execution.

I/O buffers and latches 304 can control the input of data from interface control and logic 208, and the output of data to interface control and logic 208. For example, chip select based control and clock based control of data read from memory array 202 can be accommodated via I/O buffers and latches 304. That is, registers/latches in I/O buffers and latches 304 can be controlled by way of the toggling of serial clock SCK during burst reads and sequential fetch operations, as described herein. SRAM data buffer(s) 204 can buffer/store data between memory array 202 and I/O buffers and latches 304. Address latch block 306 can receive address information via interface control and logic 208, and may provide latched addresses to X-decoder 308 for row addresses, and to Y-decoder 310 for column addresses. Incrementing of addresses can be performed via address latch block 306 and/or control and protection logic 302. Y-decoder 310 can provide column addresses to Y-Gating 312, which can include pass gates or the like to multiplex I/O lines to/from memory array 202. As discussed above, memory array 202 can include an array of volatile memory cells, or non-volatile memory cells (e.g., CBRAM, ReRAM, Flash, etc.).

In particular embodiments, SPI Flash eXecute-in-Place (XiP) performance can be improved in terms of faster access and/or lower power consumption, with minimal extra gates on both the SPI host and the memory device, and while maintaining SPI bus compliance. In certain embodiments, automatic selection of the number of dummy cycles and gap time as a function of the command opcode on both the SPI host and SPI flash memory device, as well as independent selection of the opcode, the gap time, the number of dummy cycles, and/or the mode of operation, can occur as part of an adjustment in the configuration state of a read request. In this way, making the number of wait states and gap time dependent on the opcode can allow for time and power optimization, rather than a one size fits all approach that is not optimized for a given operation.

As used herein, a "configuration state" can include a set of parameters or information (e.g., opcode, gap, mode, number of dummy cycles, etc.) that are utilized in the execution of an operation (e.g., a read operation). Further, a read request configuration state "adjustment" can be any change in a parameter or information that is associated with execution of the read operation. In addition, an "attribute" can be any property of the read request, which may be determinable from any aspect of the read request itself (e.g., the opcode, address bits, etc.) or related commands.

In one embodiment, a method of controlling a read request can include: (i) receiving, in a host device, the read request from a bus master, where the host device is coupled to a memory device by an interface; (ii) determining a configuration state of the read request; (iii) comparing an attribute of the read request against a predetermined attribute stored in the host device; (iv) adjusting the configuration state of the read request when the attribute of the read request matches the predetermined attribute; and (v) sending the read request with the adjusted configuration state from the host device to the memory device via the interface.

Serial flash devices may generally include two types of read commands: one with no addressing limitations (e.g., the EBh SPI command); and another with an address that is aligned on a double-word boundary (DWA) (e.g., the E7h SPI command). Due to the internal structure of the flash memory array, the read latency of the DWA command can be shorter than that latency for the read command that has no addressing limitations. Other parameters that impact CPU throughput and power consumption, such as the minimal required time between SPI commands or the "gap" between commands may also depend on the type and the length of each specific command.

Figure 4:
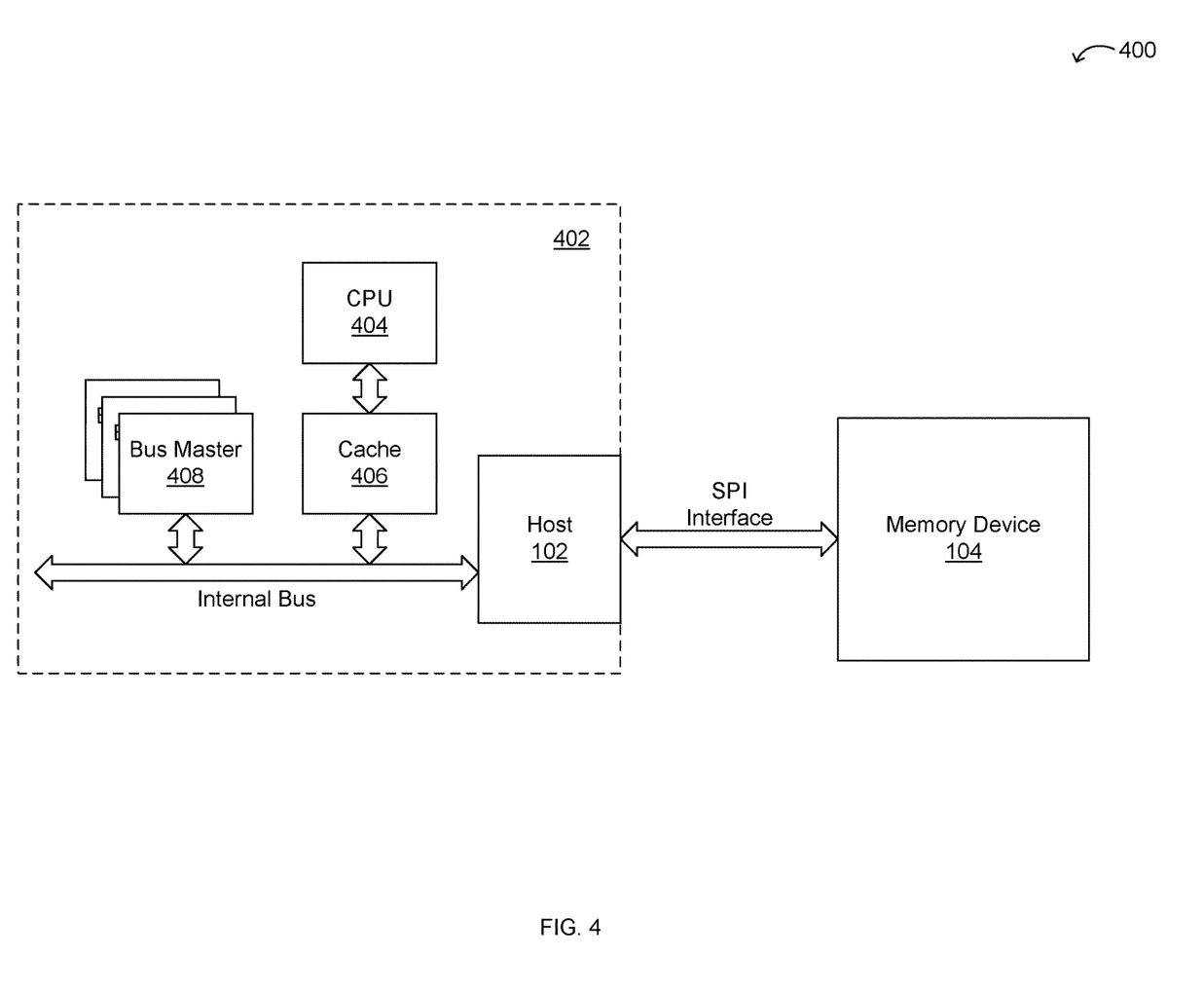
FIG. 4 is a schematic block diagram of an example memory controller system, in accordance with embodiments of the present invention.

Referring now to FIG. 4, shown is a schematic block diagram of an example memory controller system, in accordance with embodiments of the present invention. In example 400, microcontroller unit (MCU) 402 can include host device 102, CPU 404, cache 406, and bus master(s) 408. For example, MCU 402 can be a system-on-a-chip (SoC), cache 406 can include SRAM, and each bus master 408 can be any device or controller IP that can take control of the SPI bus. The internal bus, which can interface between host 102, cache 406, and bus masters 408, can include address, data, and control signaling. For example, the interface between host 102 and memory device 104 can be an SPI interface.

Particular embodiments may apply to systems that operate in the XiP mode. In this system, the CPU (e.g., through an optional cache memory) and other bus master(s) may generate read requests to the SPI host, and the SPI host may then translate these requests to SPI commands that are sent to the external flash memory device(s). The CPU throughput and power consumption in such systems may be particularly sensitive to the read latency from the flash device, and to the minimum allowable gap between two consecutive commands, as these read operations can be used for handling instruction cache misses. As such, a read command with DWA results in improved system performance (e.g., improved CPU throughput) and reduced power consumption.

Instruction cache misses are typically aligned to a double-word boundary and could potentially use the DWA read operation and/or commands that require a minimal gap between them. However, user's software can inject non-aligned reads into the stream of flash commands, and typically the CPU does not have a way to send different read commands to the flash depending on the alignment of the requested addresses, or otherwise to optimize the SPI command used for each requested read operation.

Figure 5:
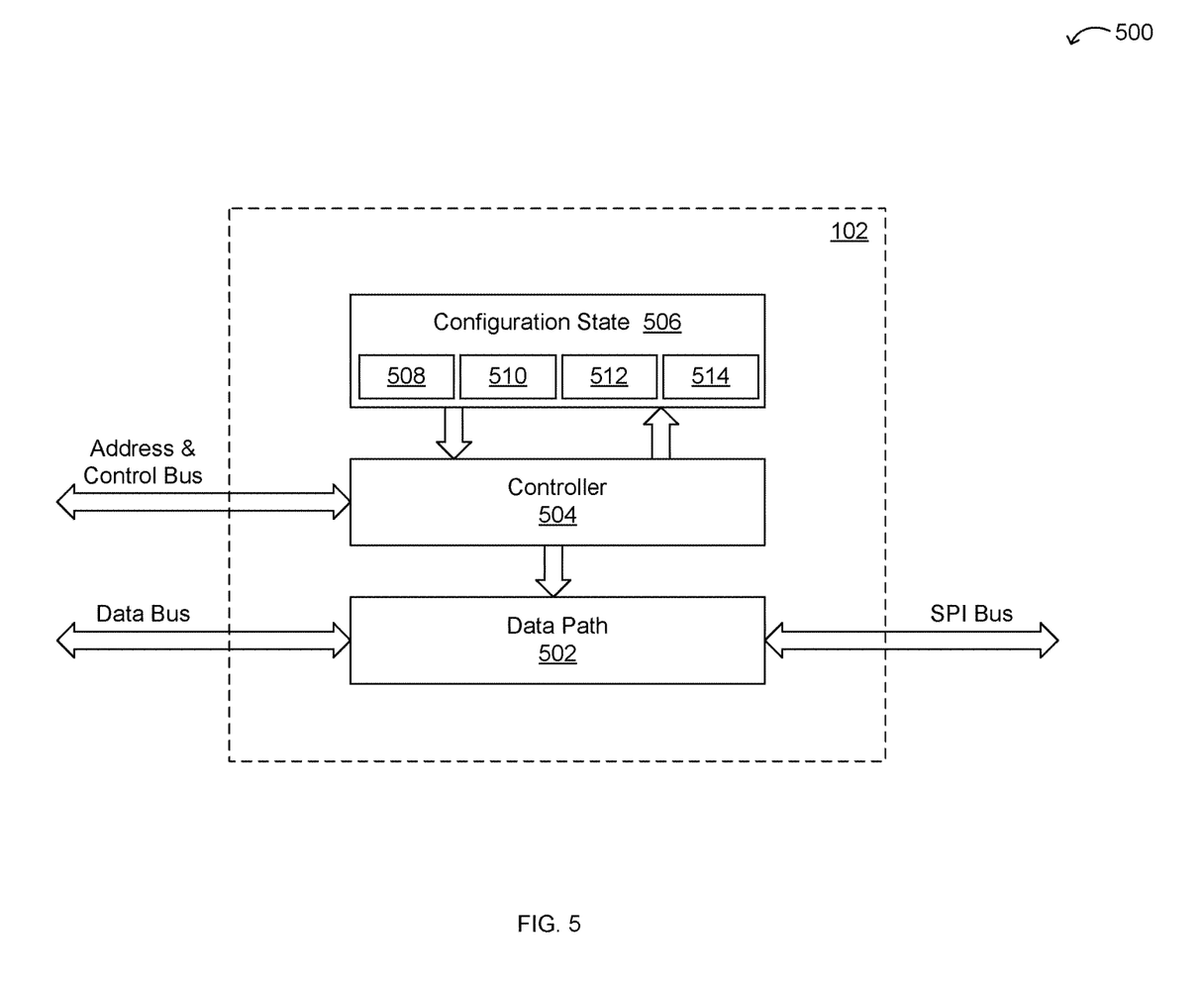
FIG. 5 is a schematic block diagram of a first example host device, in accordance with embodiments of the present invention.

Referring now to FIG. 5, shown is a schematic block diagram of a first example host device, in accordance with embodiments of the present invention. In example 500, SPI host 102 can include data path 502, controller 504, and configuration state registers 506. For example, the configuration state can be stored via registers that include opcode 508, mode 510, the number of dummy cycles 512, and the gap 514. The SPI bus can interface with one or more memory devices. The address and control bus, as well as the data bus, may interface with the cache and bus masters via the internal bus. In this case, the parameters that define which command will be sent by the SPI host, its mode of operation, and the pre-programmed gap between commands, are all provided from the single, unified configuration state, regardless of the particular read request that comes from the bus master(s).

Figure 6:
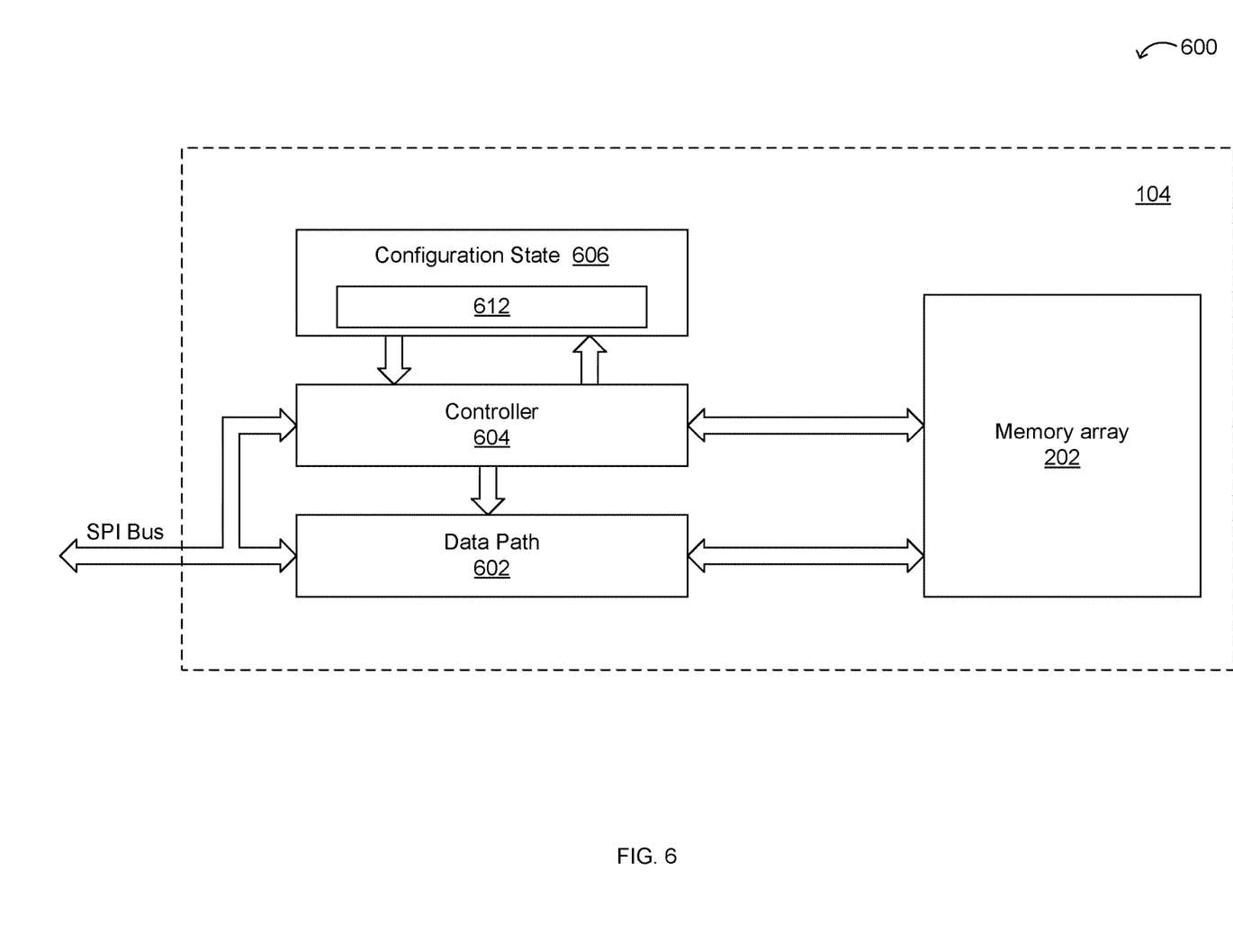
FIG. 6 is a schematic block diagram of a first example memory device with configuration state registers, in accordance with embodiments of the present invention.

Referring now to FIG. 6, shown is a schematic block diagram of a first example memory device with configuration state registers, in accordance with embodiments of the present invention. In example 600, memory device 104 can include memory array 202, data path 602 (e.g., buffer 204 and I/O interface 206 of FIG. 2), controller 604, and configuration state registers 606. Configuration state 606 can include a register that stores the number of dummy cycles 612. The SPI bus may be used to interface with the host device. However, in this case, the number of "dummy" cycles or wait states for all types of read commands is unified for all commands that have a variable number of dummy cycles. As such, both read commands that are DWA and those with no addressing limitations have the exact same number of dummy cycles and the same pre-programmed gap between consecutive SPI reads in this example. Therefore, the system utilizes the higher number of dummy cycles for both types of operations in this example.

Particular embodiments are directed to interaction between the CPU and the memory device when operating in XiP mode, and may improve the CPU throughput and reduce the power consumption of the system. A relatively small number of logic gates can be included in both the CPU (host device) and to the flash memory device for such implementation. For example, in the CPU/host, logic gates can be included to detect whether a request is aligned (e.g., DWA) or not, and may result in command adjustment in order to essentially select a different flash read command depending on that detection. The CPU/host can also use the alignment information and/or the length of the burst to modulate the gap between SPI commands. In the flash device, additional configuration bits can be included in order to specify different numbers of dummy cycles for the different read commands.

Figure 7:
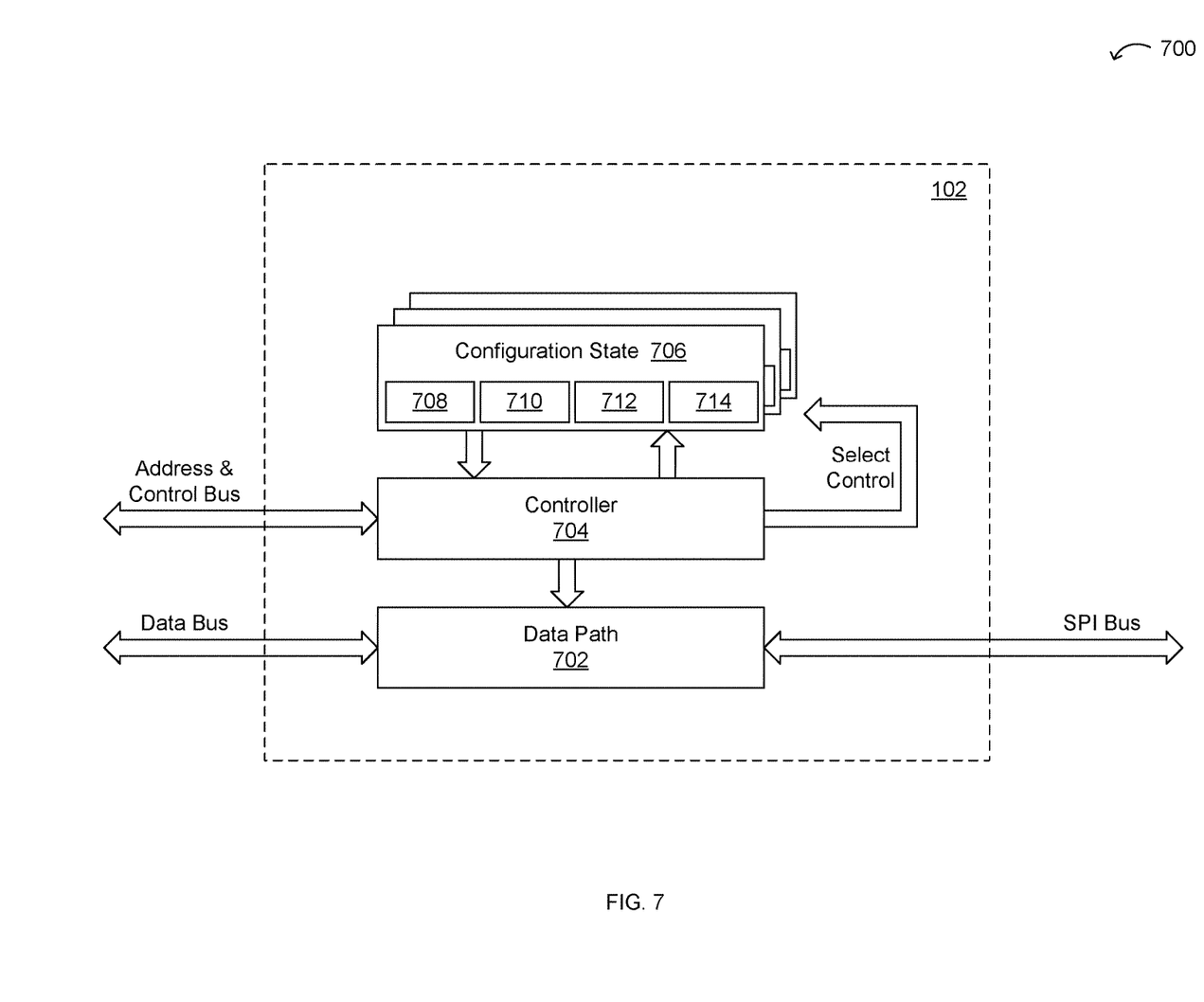
FIG. 7 is a schematic block diagram of a second example host device, in accordance with embodiments of the present invention.

Referring now to FIG. 7, shown is a schematic block diagram of a second example host device, in accordance with embodiments of the present invention. In example 700, SPI host 102 can include data path 702 (e.g., buffer 204 and I/O interface 206 of FIG. 2), controller 704, and configuration state registers 706. For example, each of the configuration state register sets can include one or more registers that store opcode 708, mode 710, the number of dummy cycles 712, and the gap 714. Any suitable number of different configuration state register sets 706 can be utilized in certain embodiments. The SPI bus can interface with one or more memory devices. The address and control bus, as well as the data bus, may interface with the cache and bus masters via the internal bus.

In particular embodiments, extra configuration registers can be added to the flash host device within the SoC, as shown. These extra configuration registers can hold the information required for handling at least two types of read commands as a result of a request from the CPU or any other bus master. As an example, one such read command may have no addressing limitation (e.g., the EBh command), and another read command may be tuned for working with read requests that are aligned (e.g., the E7h command). The "information" herein can include the command opcode, the number of dummy cycles for that command, its mode of operation, and the required gap between that command and the next one.

Other attributes may also be included in certain embodiments. In one example, the controller circuitry 704 within the SPI host can dynamically detect whether a read request from a bus master is double-word aligned (DWA) or not. For example, this can be done by checking the least significant bits (LSBs) of the requested read address (e.g., if these LSBs are all zeros, the address is aligned). Depending on the alignment, the SPI host can select or otherwise "adjust" the configuration state to be used by the command to be sent to the flash device (e.g., the op-code, mode, number of dummy cycles, gap, etc.). In addition, controller 704 can detect situations when it is safe to reduce the gap between commands, and may accordingly select/adjust the applicable configuration state. For example, this can occur in cases whereby the read request is for a long burst and/or an aligned request.

Figure 8:
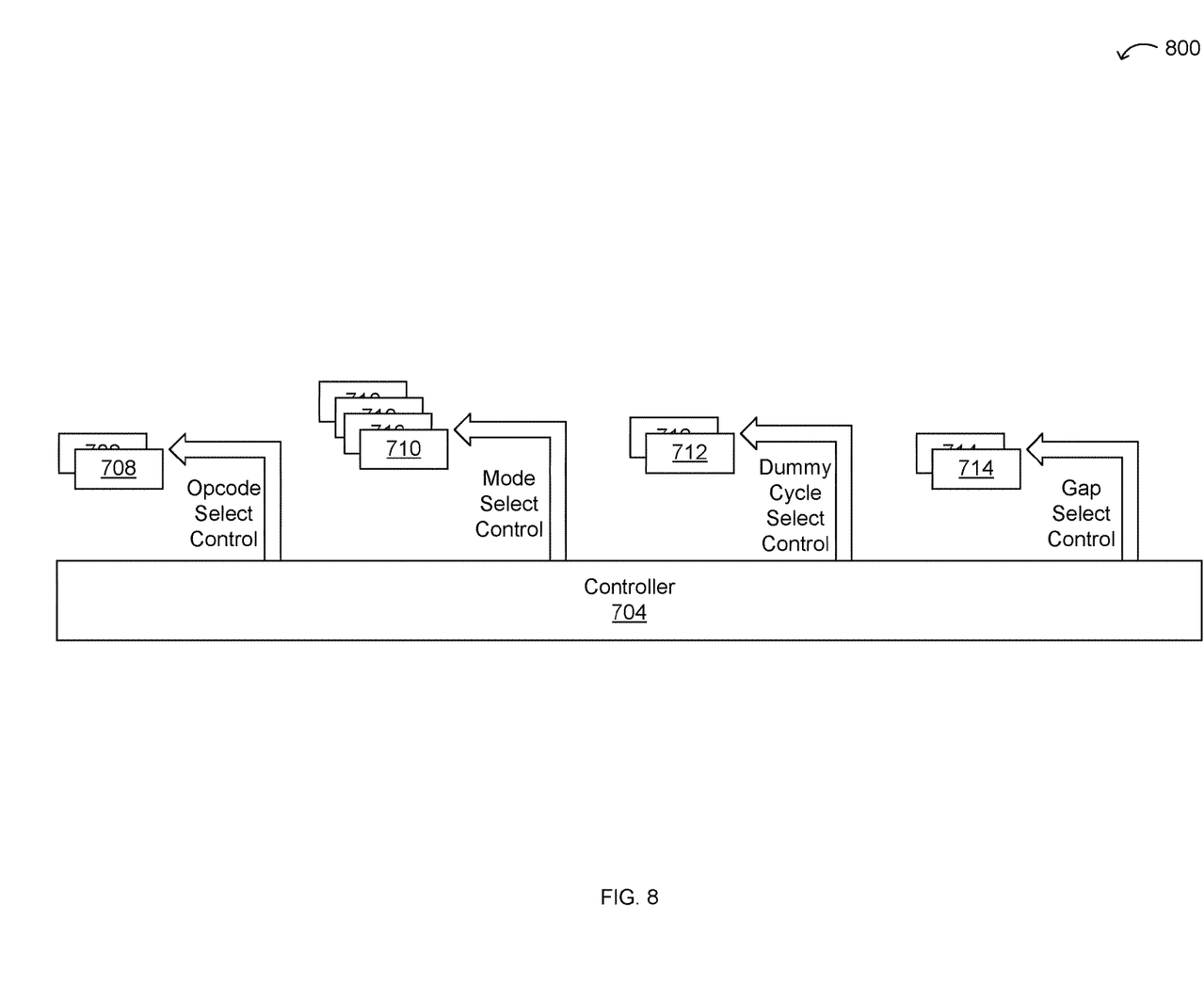
FIG. 8 is a schematic block diagram of a third example host device, in accordance with embodiments of the present invention.

Referring now to FIG. 8, shown is a schematic block diagram of a third example host device, in accordance with embodiments of the present invention. In example 800, controller 704 may utilize individual selection of the various attributes associated with a read request. For example, controller 704 can employ independent selection for opcode select control for opcodes 608, mode select control for modes 610, dummy cycle select control for the number of dummy cycle option 612, and gap select control for the gaps 614. In this example, the selection logic in controller 704 may independently select/adjust the various control fields, such as by access of registers or fields within configuration state register sets 706. In one example of gap 714 selection, the EBh SPI command when used for a read of one byte may have a required gap of 10 cycles, while if that command is used for a read of 4 bytes, the required gap may only be 5 cycles.

Figure 9:
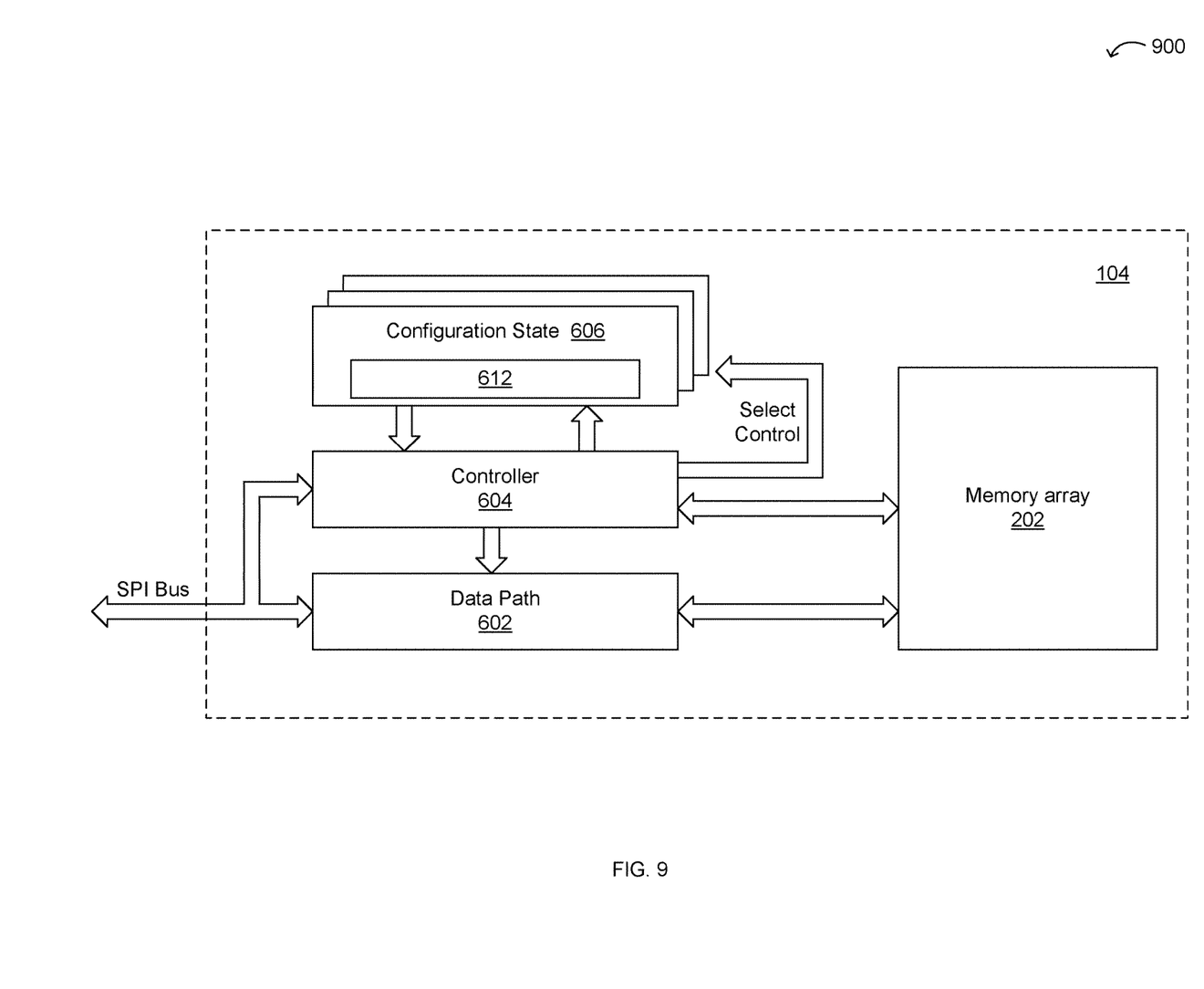
FIG. 9 is a schematic block diagram of a second example memory device with configuration state registers, in accordance with embodiments of the present invention.

Referring now to FIG. 9, shown is a schematic block diagram of a second example memory device with configuration state registers, in accordance with embodiments of the present invention. In example 900, memory device 104 can include memory array 202, data path 602, controller 604, and configuration state registers 606. Any suitable number of configuration state register sets 606 can be supported in certain embodiments. Each such configuration state register set 606 can include storage for a number of dummy cycles 612. Configuration state 606 can include the number of dummy cycles 612. The SPI bus may be used to interface with the host device. In this way, configuration bit fields can be included with an independent number of dummy cycles for each suitable read command. When a read command is received by the memory device, the number of dummy cycles can be selected/adjusted for that specific command from the respective bit field.

In this way, all XiP read requests, which are aligned by design, may utilize suitable read commands with a reduced number of dummy cycles. As a result, read latency can be reduced to improve the CPU throughput. This can improve system performance as the CPU may have to wait less time for servicing an instruction cache miss. This can also effectively improve the power consumption as the CPU may spend less time in the sub-optimal state of waiting for an instruction cache miss service.

In certain embodiments, multiple read commands can be accommodated in the memory device, with each looking for a specific bit combination (e.g., a number of zeroes), and each having its own corresponding dummy cycle setting. This may be particularly suitable for a memory device that supports multiple read modes, such as a quad device that also supports dual mode in addition to single SPI mode, or an octal device that also supports quad. In some cases, read commands that read consecutive addresses can be sent from the host device to the memory device, while in other cases read commands that read data in a wrap-around fashion can be sent to the memory device. This selection can be made in the host device by inspecting the particular attribute provided on the SoC's internal bus.

The number of dummy cycles required can be zero in some cases. In addition, any suitable number of zeroes (or ones) at the end of the address can be utilized in determining address alignment or other attributes in certain embodiments. In fact, any specific bit pattern can be predetermined in order to define when adjustment of the configuration state of the read request is to occur, and does not need to fall on specific memory array boundaries. Further, certain embodiments are applicable to any memory type, volatile or non-volatile, that has an indirect read of the memory array and may need dummy cycles or wait states at least for some read operations. For example, an "indirect read" can mean an internal read on an m-bit wide bus, where data is clocked out serially or on an n-bit wide bus, and where m is larger than n (e.g., m is 2, 4, 8 . . . $2^k$ times larger than n).

Particular embodiments may be suitable to any type of read operation, such as any of the SPI protocol modes (e.g., 1-x-x, 4-x-x, 8-x-x, 0-x-x, 0-4-4, etc.). In this notation, e.g., the first, second, and third number positions may respectively represent the number of data lines on which a command, an address, and the data is sent. In the 0-x-x or 0-4-4 mode, the opcode can be implied and thus may not be explicitly sent with every SPI read transaction. Since the opcode is missing in this command, the interleaving of EBh and E7h commands that do explicitly include an opcode can become time consuming and inefficient in this case. Thus in certain embodiments, for both aligned and non-aligned addresses, the host can send an implied EBh command in this case. However, in this mode, for aligned addresses, the host may select a first value for dummy cycles, while for non-aligned addresses, the host may select a second value for dummy cycles. The flash memory device can also support this special mode, and may monitor the address received from the host device. As such, the flash memory device can determine if the address is aligned, and the flash can pick one value for dummy cycles, and if the address is non-aligned, the flash can select another value of dummy cycles.

Figure 10:
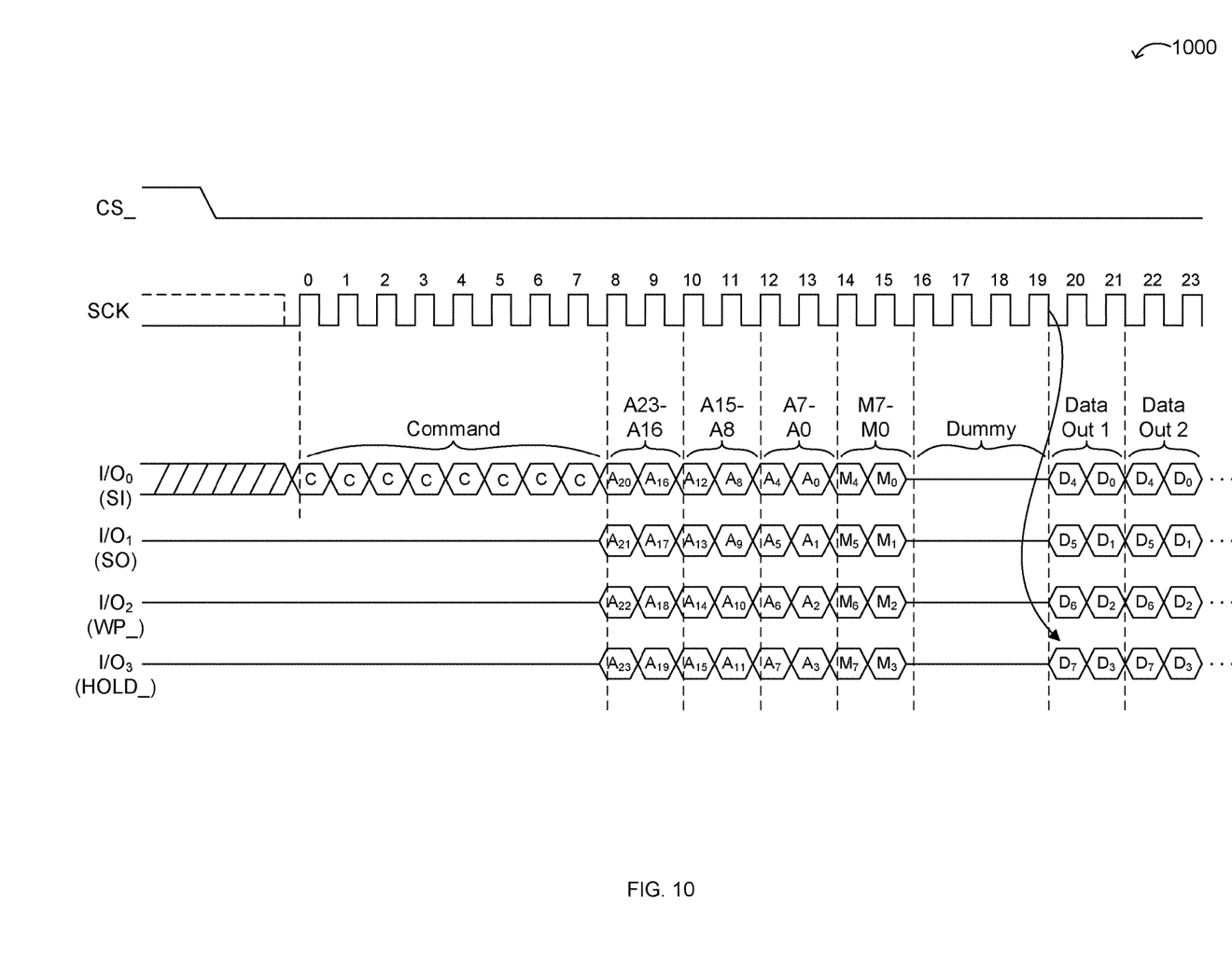
FIG. 10 is a timing diagram of a first example read access, in accordance with embodiments of the present invention.

Referring now to FIG. 10, shown is a timing diagram of a first example read access, in accordance with embodiments of the present invention. In example 1000, which shows an example of a 1-4-4 transaction, once chip select is activated and the serial clock is running, in cycles 0 to 7, the command opcode can be received via the serial input on I/O0. Thus, 8 cycles can be used to receive the command opcode via one pin. In cycles 8 and 9, most significant address byte A23-A16 can be received, in cycles 10 and 11 address byte A15-A8 can be received, and in cycles 12 and 13 address byte A7-A0 can be received. Thus, 6 cycles can be used to receive the address via 4 pins. In cycles 14 and 15, the mode byte M7-M0 can be received. Thus, two cycles can be used to receive the mode byte via 4 pins. The dummy cycles can be cycles 16 through 19 for this example command. Thus, four cycles are shown here for the dummy cycles prior to data being output starting at the falling edge of clock 19. For an 8-byte cache line of data, 16 cycles can be used to output the requested data. In addition, the gap between the next available command is 4 cycles for short data bursts and 1 cycle for long data bursts. In this example, the total cycles can be reduced from 40 without adjustment to 35 with adjustment of the configuration state, for a latency reduction in a cache-miss situation of 12.5%. For example, the cache-miss latency reduction can include reducing the dummy cycles from 4 cycles to 2 cycles (e.g., from cycle 19 to cycle 17 in FIG. 10) for an aligned address attribute, and the gap can be reduced from 4 cycles to 1 cycle for the long burst attribute.

Figure 11:
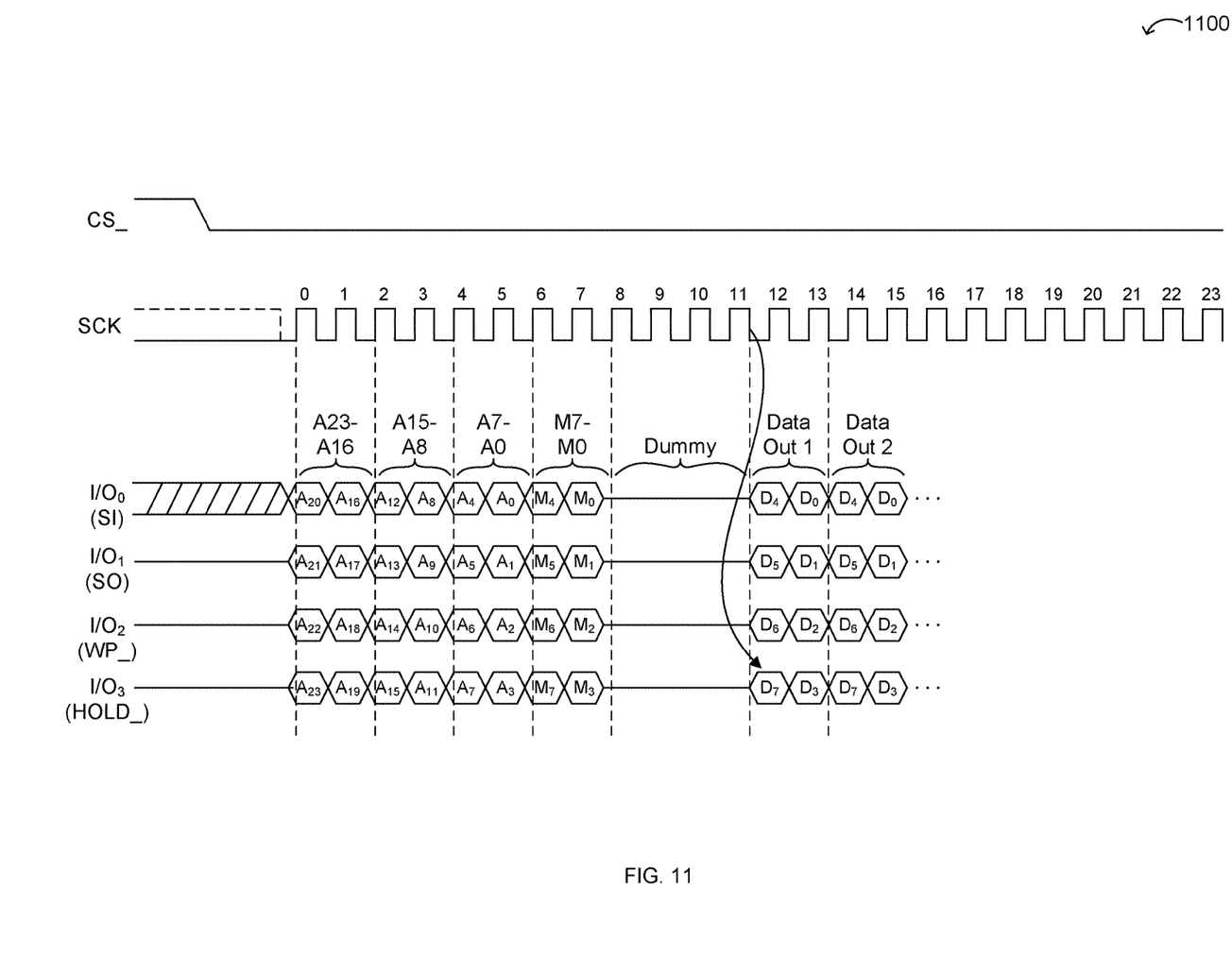
FIG. 11 is a timing diagram of a second example read access, in accordance with embodiments of the present invention.

Referring now to FIG. 11, shown is a timing diagram of a second example read access, in accordance with embodiments of the present invention. In example 1100, subsequent transfers may utilize the 0-4-4 mode whereby there is no need to reenter the command, so no clock cycles are used in receiving the command opcode. As such, once chip select is activated and the serial clock is running, in cycles 0 and 1, most significant address byte A23-A16 can be received, in cycles 2 and 3 address byte A15-A8 can be received, and in cycles 4 and 5 least significant address byte A7-A0 can be received. Thus, 6 cycles can be used to receive the address via 4 pins. In cycles 6 and 7, the mode byte M7-M0 can be received. Thus, two cycles can be used to receive the mode byte via 4 pins. The dummy cycles can be cycles 8 through 11 for this example command. Thus, four cycles are shown here for the dummy cycles prior to data being output starting at the falling edge of clock 11. For an 8-byte cache line of data, 16 cycles can be used to output the requested data. In addition, the gap between the next available command is 4 cycles for short data bursts and 1 cycle for long data bursts. In this example, the total cycles can be reduced from 32 without adjustment to 27 with adjustment of the configuration state, for a latency reduction in a cache-miss situation of 15.6%. For example, the cache-miss latency reduction can include reducing the dummy cycles from 4 cycles to 2 cycles (e.g., from cycle 11 to cycle 9 in FIG. 11) for an aligned address attribute, and the gap can be reduced from 4 cycles to 1 cycle for the long burst attribute.

Figure 12:
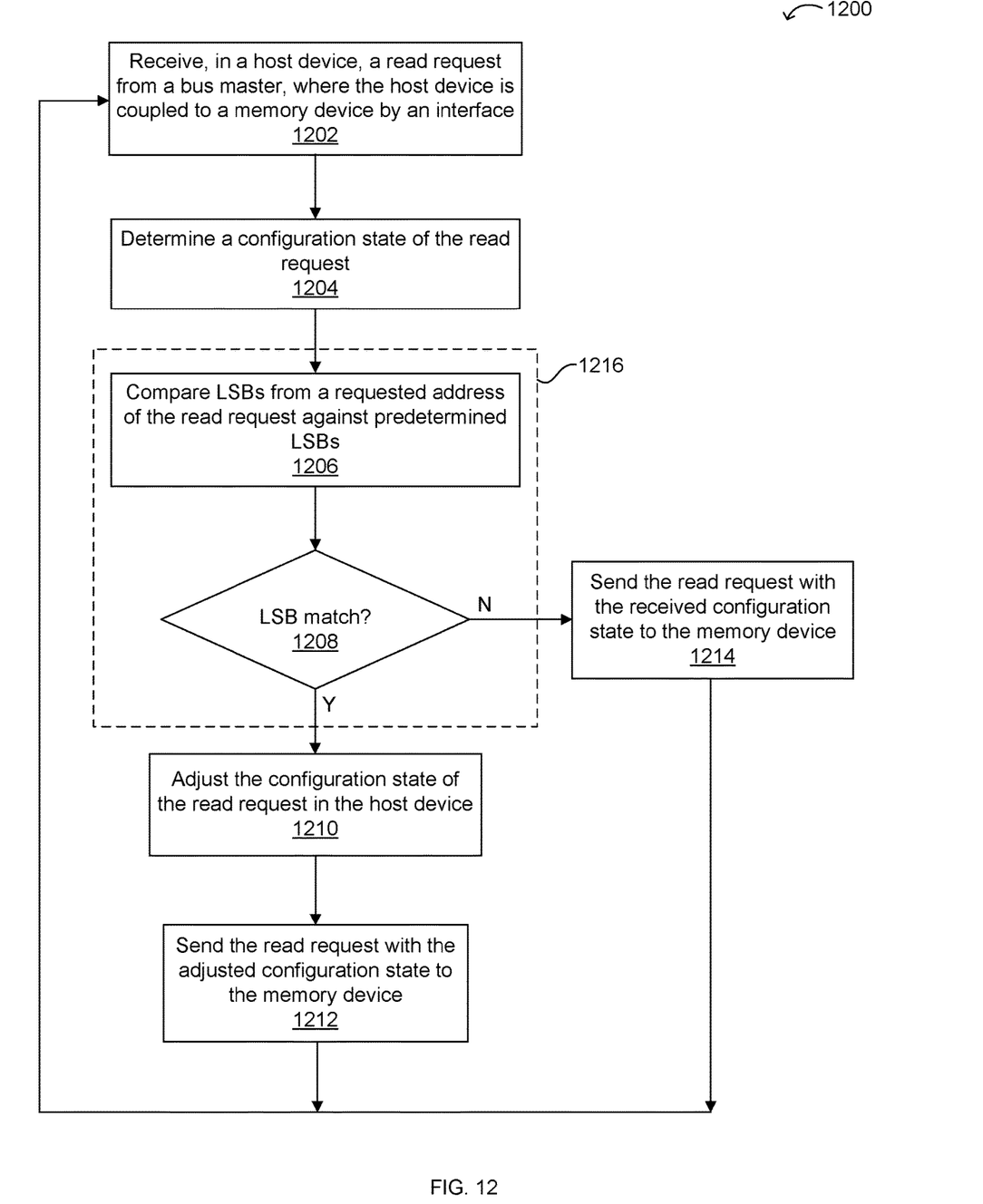
FIG. 12 is a flow diagram of an example method of controlling a read request, in accordance with embodiments of the present invention.

Referring now to FIG. 12, shown is a flow diagram of an example method of controlling a read request, in accordance with embodiments of the present invention. In example 1200, a read request can be received in a host device from a bus master at 1202. The host device can be coupled to a memory device by an interface (e.g., an SPI interface). At 1204, a configuration state of the read request can be determined. At 1206, LSBs of the read request can be compared against corresponding predetermined LSBs stored in the host device. If there is a match (1208), the configuration state of the read request can be adjusted in the host device at 1210. In this case, the read request with the adjusted configuration state can be sent to the memory device at 1212. If however, there is no LSB match (1208), the read request with the configuration state as received can be sent to the memory device at 1214. The example LSB comparison as shown in 1216 is only one such attribute that can be considered for configuration state adjustment in certain embodiments. As discussed above, any suitable attribute (e.g., address alignment, burst length, opcode, etc.) can be considered for such configuration state adjustment for a read request in certain embodiments. Further, any combination of such attributes (e.g., LSB comparison and/or burst length, etc.) can be considered in 1216 for such read request configuration state adjustment.

While the above examples include circuit, operational, and structural implementations of certain memory arrangements and devices, one skilled in the art will recognize that other technologies and/or architectures, as well as other modes of operation, can be used in accordance with embodiments. Further, one skilled in the art will recognize that other device circuit arrangements, architectures, elements, and the like, may also be used in accordance with embodiments. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of controlling a read request, the method comprising:
    a) receiving, in a host device, the read request from a bus master, wherein the host device is coupled to a memory device by an interface;
    b) determining a configuration state of the read request;
    c) comparing an attribute of the read request against a predetermined attribute stored in the host device, wherein the attribute of the read request comprises least significant bits (LSBs) of a requested address;
    d) adjusting the configuration state of the read request when the attribute of the read request matches the predetermined attribute; and
    e) sending the read request with the adjusted configuration state from the host device to the memory device via the interface.

2. The method of claim 1, wherein the configuration state of the read request is adjusted when the LSBs correspond to an aligned address in the memory device.

3. The method of claim 2, wherein the adjusting the configuration state comprises changing an opcode.

4. The method of claim 2, wherein the aligned address is double-word aligned in the memory device.

5. The method of claim 1, wherein:
    a) the memory device comprises a non-volatile memory; and
    b) the interface comprises a serial interface.

6. The method of claim 1, wherein the attribute of the read request comprises a long burst request.

7. The method of claim 6, wherein the adjusting the configuration state comprises changing a gap.

8. The method of claim 1, wherein the adjusting the configuration state comprises changing at least one of an opcode, a mode, a number of dummy cycles, and a gap.

9. The method of claim 1, further comprising selecting, in the memory device, a number of dummy cycles for the read request.

10. A memory controller having a host device that is adapted to:
    a) receive a read request from a bus master, wherein the host device is coupled to a memory device by an interface;
    b) determine a configuration state of the read request;
    c) compare an attribute of the read request against a predetermined attribute stored in the host device, wherein the attribute of the read request comprises least significant bits (LSBs) of a requested address;
    d) adjust the configuration state of the read request when the attribute of the read request matches the predetermined attribute; and
    e) send the read request with the adjusted configuration state from the host device to the memory device via the interface.

11. The memory controller of claim 10, wherein the configuration state of the read request is adjusted when the LSBs correspond to an aligned address in the memory device.

12. The memory controller of claim 11, wherein the adjustment of the configuration state comprises a change in an opcode.

13. The memory controller of claim 11, wherein the aligned address is double-word aligned in the memory device.

14. The memory controller of claim 10, wherein:
  a) the memory device comprises a non-volatile memory; and
  b) the interface comprises a serial interface.

15. The memory controller of claim 10, wherein the attribute of the read request comprises a long burst request.

16. The memory controller of claim 15, wherein the adjustment of the configuration state comprises a change in a gap.

17. The memory controller of claim 10, wherein the adjustment of the configuration state comprises a change in at least one of an opcode, a mode, a number of dummy cycles, and a gap.

18. The memory controller of claim 10, wherein the memory device is adapted to select a number of dummy cycles for the read request.

\* \* \* \* \*